Nov. 12, 1963     G. B. FEILD     3,110,623
ETHYLENE-PROPYLENE COPOLYMER INSULATION
ON AN ELECTRICAL CONDUCTOR
Filed Aug. 25, 1960

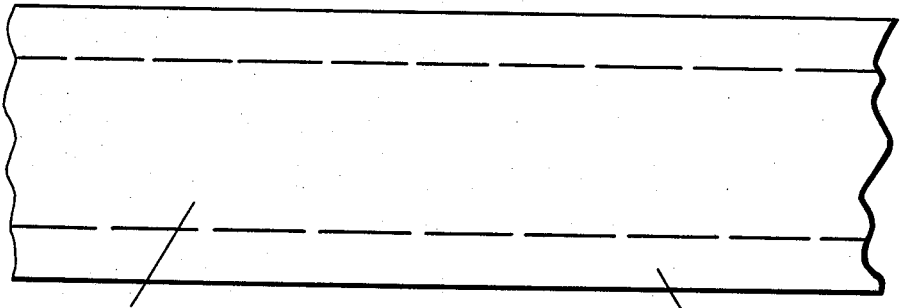

Electrical conductor, such as a metallic wire

FIG. 1

Ethylene--propylene copolymer insulation having a propylene content of from about 8 mole percent to about 15 mole per cent

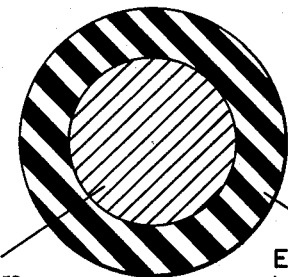

Electrical conductor, such as a metallic wire

FIG 2

Ethylene--propylene copolymer insulation having a propylene content of from about 8 mole percent to about 15 mole per cent

GEORGE B FEILD
INVENTOR.

BY Ernest G. Peterson

AGENT 3,110,623
ETHYLENE-PROPYLENE COPOLYMER INSULA-
TION ON AN ELECTRICAL CONDUCTOR
George B. Feild, New Castle, Del., assignor to Hercules
Powder Company, Wilmington, Del., a corporation of
Delaware
Filed Aug. 25, 1960, Ser. No. 51,784
4 Claims. (Cl. 117—232)

This invention relates to insulated electrical conductors and more particularly electrical conductors insulated with a coating comprising an ethylene-propylene copolymer.

Various materials have been utilized in the past for coating and insulating electrical conductors. Among the more commonly used coatings which may be mentioned are the conventional enamel or oleoresinous varnish-type coatings, natural or synthetic rubbers, polyvinyl resins, polystyrene resins, etc. All of these coating compositions have been found to be lacking in one respect or another. For example, the enamel or varnish coatings lack adequate flexibility. The rubber coatings are not sufficiently resistant to the action of organic solvents with which such wire is frequently in contact, as in refrigeration units, etc. Furthermore, the rubber coatings deteriorate with age and exposure to the atmosphere, resulting in the cracking and peeling of the rubber coating. The polyvinyl and polystyrene resin coatings must be plasticized in order to have sufficient flexibility and consequently are subject to attack by organic solvents. Even if not exposed to solvents, the plasticizers being relatively volatile are lost on aging and these coatings then become brittle. Hence these materials are not completely satisfactory for electrical insulation.

Recent improvements in the art of polymerization have enabled the production of ethylene-propylene copolymers that are essentially homogeneous as to composition, i.e., the mole ratio of the monomers in isolatable fractions of the total polymer is nearly constant, and which have a relatively narrow molecular weight distribution.

It has now been discovered that the homogeneous ethylene-propylene copolymers having a propylene content of from about 8 mole percent to about 15 mole percent, more preferably from about 10 mole percent to about 13 mole percent, and an RSV of at least about 1.5, more preferably from about 1.6 to about 3.5, exhibit superior properties as insulating coatings for electrical conductors. By the term "reduced specific viscosity" (RSV) is meant the $\eta_{sp}/C$ determined on an 0.1% solution of the copolymer in decalin, containing 0.1 g. of the copolymer per 100 ml. of solution, at 135° C.

More particularly, the properties of such copolymers which render them suitable for coating electrical conductors include the following:

(1) The copolymers are easily cross-linked by free-radical mechanisms thus enabling the formation of coatings that are resistant to elevated temperature and to organic solvents.

(2) The copolymers can be processed easily at moderate temperatures so that premature cross-linking is avoided during deposition, e.g., by extrusion, of the coatings thus enabling the obtention of smooth, coherent coatings.

(3) The copolymers are exceptionally tough and flexible and can withstand repeated bending and similar physical manipulation without breaking.

(4) The copolymers will tolerate a large amount of fillers without undue loss of flexibility, which helps to lower the cost of the coatings.

(5) Coatings prepared from the copolymers are resistant to oxidation and aging and, hence, are long lived.

(6) The copolymers have excellent electrical properties which are not materially affected by organic solvents or soaking in water.

(7) Since no plasticizer is required in compounding these copolymers, there is no problem of extraction by solvents or loss by volatility of plasticizer.

Accordingly, this invention relates to an insulated electrical conductor comprising an electrical conductor and, as insulation therefor, a copolymer of ethylene and propylene having a propylene content of from about 8 mole percent to about 15 mole percent and an RSV of at least about 1.5, wherein at least 90 percent of the total copolymer has a propylene content within 5 percentage units of the average composition.

The copolymers useful in this invention are prepared by copolymerizing ethylene and propylene in a homogeneous liquid phase reaction mixture by passing ethylene and propylene into an inert liquid organic solvent having dissolved therein the copolymerization catalyst, at such a rate that the ratio of ethylene to propylene dissolved in the reaction mixture is kept constant throughout the polymerization reaction, wherein the catalyst used for the copolymerization reaction is that formed by mixing an organoaluminum halide with a vanadium compound having the formula $VOY_{3-n}X_n$ where Y is an alkoxide group or acetylacetonate group, X is halogen, and $n$ is 0–2 when Y is an alkoxide group, and $n$ is 0 when Y is an acetylacetonate group. By carrying out the process in this manner, it has been discovered that all of the copolymer so produced is homogeneous as to its composition and has a relatively narrow molecular weight distribution.

One of the criteria of producing a homogeneous copolymer of uniform composition is the catalyst that is used for the copolymerization reaction. It has been found that the catalyst formed by reacting an organoaluminum halide with an ester of orthovanadic or haloorthovanadic acid or a vanadium oxyacetylacetonate is unique in that the copolymer produced using this catalyst in the manner described is essentially homogeneous as to its composition, i.e., the mole ratio of the monomers in isolatable fractions of the total polymer is nearly constant. As already stated, the effective catalyst is formed by mixing the aluminum compound and the vanadium compound. This mixing can be done prior to introduction of the catalyst in the polymerization system or the catalyst can be produced in situ by the addition of one or both of the catalyst ingredients. Any organoaluminum halide, i.e., diorganoaluminum halide, organoaluminum dihalide or mixtures of the two, such as ethylaluminum sesquichloride, can be used as the aluminum compound in this catalyst system.

The vanadium compound can be any compound having the formula $VOY_{3-n}X_n$ where Y is an alkoxide group or acetylacetonate group, X is halogen, and $n$ is 0–2 when Y is an alkoxide group, and $n$ is 0 when Y is an acetylacetonate group. Thus, the vanadium compound can be a trialkyl ester of orthovanadic acid, a dialkyl ester of halo-orthovanadic acid, or an alkyl ester of dihaloorthovanadic acid, which esters have the general formula VO(OR)$_{3-n}$X$_n$ where R is alkyl, X is halogen and $n$ is 0–2, or the vanadium compound can be a vanadium oxytriacetylacetonate, which compounds have the general formula VOA$_3$ where A is the acetylacetonate radical, or a haloacetylacetonate radical. The catalyst for the copolymerization reaction can be prepared prior to introduction into the reaction mixture by mixing solutions of the two catalyst ingredients, either in the diluent that is used for the reaction or in a diluent that is miscible with the reaction diluent. If a homogeneous copolymer is desired, continuous addition of either the premixed catalyst or continuous addition of both catalyst ingredients is preferred. Regardless of the method by which the catalyst is formed, that is, premixed or formed in situ, by one means or another the amount of catalyst added or formed at any one time must be such that it will remain in solution in the polymerization mixture. In general, the rate of addition of the catalyst will preferably be at or below about 3 millimoles of vanadium per liter per hour. The ratio of aluminum compound to vanadium compound can be varied considerably but generally will be such that there is at least one aluminum for every oxygen in the vanadium compound.

The copolymers used as insulating coatings in this invention are prepared in an inert liquid organic diluent which is a solvent for the polymerization system. In order to obtain a copolymer product of homogeneous composition throughout, the diluent should be one that is a solvent not only for the monomers being copolymerized but also for the polymer that is produced. In addition, it should also be a solvent for the catalyst, so that the entire copolymerization reaction mixture is homogeneous throughout the copolymerization process. Suitable diluents for the copolymerization are, in general, the hydrocarbon solvents, i.e., aromatic, alicyclic and aliphatic hydrocarbons, chlorinated aromatic, alicyclic and aliphatic hydrocarbons and mixtures thereof.

In general, the temperature at which the copolymerization is conducted depends on the ratio of propylene to ethylene. However, in general, to prepare copolymers containing less than about 30 mole percent of propylene, it is necessary to use increasingly high temperatures as the mole percentage of propylene decreases. For instance, it is preferred to carry out the copolymerization at about 75–85° C. when the desired copolymer contains 10 mole percent of propylene. The reaction can be carried out at from about 1 to 100 atmospheres pressure.

During the reaction, the ratio of propylene to ethylene in the gas phase is very different from that in the liquid phase since propylene is more soluble than ethylene, and ethylene is more reactive than propylene, so that the two monomers do not enter the copolymer in the ratio of their concentration in the solution. The composition of the copolymer being formed at any one moment is given by the equation:

$$\frac{m_2}{m_3} = \frac{M_2}{M_3}\left(\frac{r_2 M_2 + M_3}{r_3 M_3 + M_2}\right)$$

where M$_2$ and M$_3$ are mole fractions of ethylene and propylene, respectively, in the gas phase in equilibrium with the solution, $m_2$ and $m_3$ are mole fractions of ethylene and propylene in the copolymer being formed, and $r_2$ and $r_3$ are the reactivity ratios for ethylene and propylene, respectively, based upon monomer concentrations in the gas phase. In making copolymers useful as insulation for electrical conductors, $r_2$ and $r_3$ are approximately 5 and 1/5, respectively. Using these $r_2$ and $r_3$ values and inserting the mole fraction of ethylene and propylene desired in the copolymer, it is then possible to calculate what monomer ratio should be maintained in the gas phase in equilibrium with the solution and so produce the desired copolymer. These ratios can be maintained by monitoring the composition of the off-gas from the reaction and adjusting the ratios of the ethylene and propylene in the inlet streams.

By carrying out the copolymerization process in the above manner, it is possible to produce homogeneous copolymers of widely varying molecular weights and compositions. However, for purposes of wire coating, it has been found that those copolymers having a propylene content of from about 8 mole percent to about 15 mole percent, more preferably from about 10 mole percent to about 13 mole percent, and an RSV of at least about 1.5, more preferably from about 1.6 to about 3.5, possess excellent properties. Such copolymers are further characterized by a maximum density of less than about 0.920 and a maximum percentage of crystallinity of less than about 73%. As the propylene content is decreased below 8 mole percent, the copolymers tend to become less flexible and, hence, lose the desirable properties of the present copolymers. As the propylene content is increased above 15 mole percent, the copolymers tend to lose strength, resistance to aging and resistance to organic solvents. Copolymers having an RSV of substantially below 1.5 tend to be weak independent of their propylene content.

Before describing the invention in greater detail, the following examples are presented to illustrate the preparation of the copolymers from which the insulated electrical conductors of this invention are prepared. All parts and percentages are by weight unless otherwise indicated.

EXAMPLES 1–6

In these examples a series of ethylene-propylene copolymerizations was conducted in a 100-gallon reactor with a catalyst formed in situ. The apparatus was alternately evacuated and flushed with nitrogen three times, 50 gallons of the diluent, chlorobenzene, was added under nitrogen. The temperature of the reactor was adjusted to the desired level and streams of ethylene and propylene metered through a calibrated rotameter, mixed and introduced into the reactor below the liquid level. The diluent was saturated with a mixture of ethylene and propylene in the proper ratio to yield a copolymer of desired composition. The ratio was calculated as described above. An additional rotameter was used to record the volume of the off-gas. When the inlet and off-gas rotameter readings were identical, indicating that saturation was complete, the volume of the input mixture was reduced to 250 ml./min., and the off-gas was passed through a thermal conductivity cell so that its composition could be monitored and kept constant throughout the copolymerization run. The two catalyst ingredients, diethylaluminum chloride and tri-t-butyl orthovanadate, were added as 0.1 M and 0.02 M solutions in n-heptane, respectively. As soon as the copolymerization reaction started, there was an immediate drop in the value of the off-gas reading. At this point a second additional input stream (containing ethylene and propylene in the desired ratio for the copolymer being produced) was added at whatever rate was necessary to keep the total off-gas volume at 250 ml./min. Therefore, the rate of addition of the second stream corresponded to the rate of reaction, and the off-gas composition remained constant. In each example the reaction mixture was homogeneous throughout the run.

The reaction was stopped in each example by adding 1 gallon of n-butanol. Each product was washed at 80° C. with an aqueous solution of sodium hydroxide, and small amounts of gluconic acid and 4,4′-thio-bis(6-tert-butyl-m-cresol). Then each copolymer was isolated by evaporating the solvent at a temperature of 160° C. Isolated fractions of each copolymer had a relatively narrow molecular weight distribution and a propylene content which varied less than 5 percentage units from the average.

The data for each copolymerization are tabulated below in Table I along with the description of the copolymer produced.

Table 1

| Example No. | Off-gas Mole Percent $C_3H_6$ | Temp., °C [a] | Reaction Time (Hrs.) | Al/V [b] | Product | | | | | |
|---|---|---|---|---|---|---|---|---|---|---|
| | | | | | Total lbs. | RSV | Mole Percent $C_3H_6$ | Density [c] | Max. Percent [d] Crystallinity | Percent Ash |
| 1 | 26 | 82 | 4 | 8.0 | 5.1 | 3.4 | 8.0 | 0.920 | 71 | 0.12 |
| 2 | 34 | 79–80 | 4 | 16 | 6.0 | 2.3 | 8.0 | 0.916 | 53 | 0.13 |
| 3 | 42 | 75–80 | 4 | 25 | 5.2 | 2.3 | 10.0 | 0.907 | 49 | 0.08 |
| 4 | 42 | 75–82 | 4.5 | e 22 | 7.7 | 1.8 | 11.0 | 0.910 | 45 | 0.10 |
| 5 | 48 | 83 | 4 | 27 | 5.0 | 2.4 | 13.0 | 0.897 | 42 | 0.04 |
| 6 f | 43 | 75–80 | 6 | e 25 | 30.0 | 2.7 | 14.5 | 0.896 | 36 | 0.06 |

[a] The pressure was 28–30 p.s.i.g. in each example.
[b] Mole ratio of diethylaluminum chloride to tri-t-butyl orthovanadate, the latter added at 0.04 mmole/liter/hr.
[c] Determined in density-gradient column.
[d] Based on infrared values for crystalline isotactic polypropylene, amorphous polypropylene and minimum amorphous methylene content of each sample.
[e] Vanadate added at 0.06 mmole/liter/hr.
[f] 100 gallons of solvent used.

The above-described copolymers can be used as insulating coatings on all types of electrical conductors either cross-linked, i.e., vulcanized, or in the form of uncured gums. Whether the copolymers are to be cross-linked depends primarily on the ultimate use to be made of the insulated electrical conductor, but in most instances cross-linking is desirable in order to realize the full advantages of the copolymers. To effect cross-linking, a suitable cross-linking agent can be incorporated in the copolymer prior to coating the electrical conductor. Various free radical producing agents can be used as such agents, organic peroxides being especially suitable. Exemplary of useful peroxides are 2,5-bis(t-butylperoxy)-2,5-dimethylhexane, bis(α,α - dimethylbenzyl)peroxide, bis(α,α-dimethyl-p-methylbenzyl)peroxide, di-t-butyl peroxide, bis(α,α-diisopropylnaphthylmethyl)peroxide, bis(α,α-dimethyl - p - isopropylbenzyl)peroxide, benzyl(α-methylbenzyl)peroxide, benzyl(α,α-dimethylbenzyl)peroxide, p-menthyl(α,α-dimethylbenzyl)peroxide, t-butyl-1,1,2,2-tetramethyl propyl peroxide, etc. If desired, auxiliary cross-linking agents, such as sulfur, can be used in combination with the peroxide.

The copolymers can be, and often are, mixed with one or more additives such as fillers, pigments, extenders, etc. The additives that can be incorporated should be selected from those whose electrical properties are such as will not reduce or impair the electrical properties of the insulated conductor. The amount of such additives included in the insulation composition will, of course, depend upon the ethylene-propylene copolymer being used, the type of electrical conductor being insulated, and the ultimate use to be made of the insulated electrical conductor. Exemplary of the fillers that can be mixed with the copolymers used in this invention are calcium carbonate; iron oxide; carbon blacks such as those made by the channel, furnace or thermal processes; silica such as silica xerogel, silica aerogel, fumed silica, alkyl-surface-esterified silica as described in U.S. Patent 2,657,149, alkyl chlorosilane-treated silica as described in U.S. Patent 2,510,661, precipitated (hydrated) calcium silicate, etc.; and alumina such as hydrated aluminum oxide, activated (dehydrated) alumina, α-alumina, gamma-alumina, etc.

The coating of ethylene-propylene copolymer on an electrical conductor can be carried out by several well-known methods. For instance, a conductor, e.g., wire, can be coated (insulated) by extruding the copolymer around the wire in one of the well-known machines suitable for this purpose. In such extrusion operations the wire to be coated is fed through a heated die and the heated copolymer or mixture of copolymer and such additives as may be desirable is caused to flow through the die and around the wire. If a cross-linking agent is incorporated in the copolymer, then the coating on the wire can be cured by heating. Such heating is often carried out by passing the coated wire through a steam tunnel at a temperature of from about 190 to about 220° C., each section of the coated wire being subjected to this heat for a period of at least about 25 seconds. FIGURES 1 and 2 of the accompanying drawing represent such a coated wire. FIGURE 1 represents a side view of the coated wire and FIGURE 2 represents a cross-sectional view through the coated wire.

Since tapes prepared from an ethylene-propylene copolymer show the unusual property, in the uncured state, of maintaining a high percentage of their elongation upon stretching at room temperature and of recovering almost completely to their original length when subsequently heated, an electrical conductor can alternatively be coated by winding with such tape. After winding, the copolymer can be then heat-shrunk to give a tight air-free coating suitable for high voltage use. If an appropriate cross-linking agent is incorporated, the copolymer can be heat-shrunk and cross-linked simultaneously.

While a stabilizer is not always required in ethylene-propylene copolymer formulations, it may be desirable, particularly when coating by extrusion since the copolymer is held at relatively high temperatures in the presence of air. Exemplary of the stabilizers that can be used are 4,4'-thio-bis(6-tert-butyl-m-cresol), polymerized trimethyl dihydroquinoline, phenyl-beta-naphthylamine, etc. The amount of such stabilizer incorporated in the copolymer prior to coating the electrical conductor can be varied over a wide range and is within the discretion of the compounder.

The following examples will illustrate the preparation of electrical conductors insulated with ethylene-propylene copolymers, parts and percentages being by weight unless otherwise specified.

EXAMPLES 7–9

The copolymers from Examples 2, 4 and 5 were compounded with carbon black and a cross-linking agent as follows:

| | Example 7 | Example 8 | Example 9 |
|---|---|---|---|
| Copolymer of Example 2, 8 mole percent propylene RSV 2.3 | 100 | | |
| Copolymer of Example 4, 11 mole percent propylene RSV 1.8 | | 100 | |
| Copolymer of Example 5, 13 mole percent propylene RSV 2.4 | | | 100 |
| Medium thermal black | 80 | 80 | 80 |
| Bis(α,α-dimethylbenzyl) peroxide | 3 | 3 | 3 |

The above compositions were extruded over 20 gauge copper wire using a one-inch screw-type extruder with a crosshead wire coating die and a heated cylinder. Using a cylinder temperature of 120° C. in the extruder, a smooth uniform coating of about 10–15 mils thickness was obtained. The coated wire was then cured by passing it through a steam tunnel at a temperature of about 200° C. The speed at which the coated wire was passed through the tunnel was regulated so as to be equivalent to a one-minute cure at 200° C. There was no indication of scorch, i.e., premature cross-linking, in any of the coatings.

When sections of the coated wires were tied tightly into knots, there was no evidence of cracks in the coating or separation between wire and coating. Toughness and flexibility were demonstrated by repeated flexing of the coated wires. In each case the wire broke before the coating.

The qualities of the coated wires were further evaluated by subjecting different sections of the coated wires to immersion in water for 21 days and exposure to a temperature of 121° C. in the presence of air for 7 days. The wires which had been so treated were again examined for toughness and flexibility of their coatings, and it was found that the coatings in all cases had retained their original toughness and flexibility to a degree such that the coatings still withstood repeated flexing until the wires themselves broke. Even after immersion for 18 hours in gasoline, there was no visible change in a section of the coated wire.

Similarly, the excellent electrical characteristics of the various coatings and their ability to retain such characteristics after exposure to adverse conditions are typified by the following determinations of dielectric constant and dissipation factor (ASTM D-150-54T at 1 kc.) on the coatings of Examples 8 and 9 before and after immersion in water for 21 days:

| Coating Composition of Example— | Before Immersion | | After Immersion | |
|---|---|---|---|---|
| | Dielectric Constant | Dissipation Factor | Dielectric Strength | Dissipation Factor |
| 8 | 5.48 | 0.004 | 5.48 | 0.005 |
| 9 | 5.23 | 0.002 | 5.23 | 0.003 |

It can be seen that insulated electrical conductors having excellent dielectric properties coupled with freedom from brittleness can be prepared by coating an electrical conductor with a copolymer of ethylene and propylene having a propylene content of from about 8 mole percent to about 15 mole percent, more preferably from about 10 mole percent to about 13 mole percent, and an RSV of at least about 1.5, more preferably from about 1.6 to about 3.5. Copolymers having an RSV of greater than 3.5 may also be used depending on the coating composition and procedure employed.

What I claim and desire to protect by Letters Patent is:

1. An insulated electrical conductor comprising an electrical conductor and as insulation therefor a copolymer of ethylene and propylene having a propylene content of from about 8 mole percent to about 15 mole percent and an RSV of at least about 1.5 wherein at least 90 percent of the total copolymer has a propylene content within 5 percentage units of the average composition.

2. The insulated electrical conductor of claim 1 wherein the copolymer insulation comprises a cross-linked copolymer of ethylene and propylene.

3. The insulated electrical conductor of claim 2 wherein the copolymer insulation contains at least one filler selected from the group consisting of calcium carbonate, iron oxide, the carbon blacks, the silicas and the aluminas.

4. An insulated electrical conductor comprising an electrical conductor and as insulation therefor a copolymer of ethylene and propylene having a propylene content of from about 10 mole percent to about 13 mole percent and an RSV of at least about 1.5 wherein at least 90 percent of the total copolymer has a propylene content within 5 percentage units of the average composition.

References Cited in the file of this patent

UNITED STATES PATENTS

| 2,958,672 | Goldberg | Nov. 1, 1960 |
| 3,012,016 | Kirk et al. | Dec. 5, 1961 |

FOREIGN PATENTS

| 1,032,917 | Germany | June 26, 1958 |
| 205,226 | Austria | Sept. 10, 1959 |